United States Patent [19]

Dumont

[11] Patent Number: 4,838,297

[45] Date of Patent: Jun. 13, 1989

[54] APPARATUS FOR INJECTING A FLUID INTO A NETWORK

[76] Inventor: Marc Dumont, 19 rue de l'Egalité, 32700 Lectoure, France

[21] Appl. No.: 138,850

[22] PCT Filed: Jan. 15, 1987

[86] PCT No.: PCT/FR87/00014

§ 371 Date: Nov. 30, 1987

§ 102(e) Date: Nov. 30, 1987

[87] PCT Pub. No.: WO87/04586

PCT Pub. Date: Aug. 13, 1987

[30] Foreign Application Priority Data

Jan. 30, 1986 [FR] France ................. 86 01419

[51] Int. Cl.⁴ .............. A01C 23/04; A01M 7/00; F04B 13/02
[52] U.S. Cl. ........................... 137/99; 417/345; 417/394
[58] Field of Search ............ 137/99; 417/345, 394, 417/517

[56] References Cited

U.S. PATENT DOCUMENTS

| | | | |
|---|---|---|---|
| 2,653,552 | 9/1953 | Geeraert | 417/345 X |
| 3,256,908 | 6/1966 | Mann | 137/571 |
| 3,524,714 | 8/1970 | Grove | 417/394 X |
| 3,590,846 | 7/1971 | Eisele | 137/101.11 |
| 3,791,768 | 2/1974 | Wanner | 137/99 X |
| 3,815,621 | 6/1974 | Robinson | 137/99 X |
| 4,394,870 | 7/1983 | Macphee | 137/99 |

Primary Examiner—Robert G. Nilson
Attorney, Agent, or Firm—Harold H. Dutton, Jr.

[57] ABSTRACT

The device for injecting a fluid into a network comprises storage and supply means (1, 2) for the fluid to be injected, an injector (11) and a proportioning unit (7) to obtain a constant injection ratio. The injector (11) comprises two housings (12) each provided with a fluid-tight pocket (15) of variable volume. Said injector further comprises two distributors (16,17): a first distributor (16) providing for the filling of a pocket (15a) with the fluid to be injected and simultaneously for the emptying of the other pocket (15b): a second distributor (17) providing in parallel for the filling with an auxiliary fluid of the housing (12b) containing the pocket (15b) being emptied and simultaneously for the emptying of the other housing (12a). The injector (11) finally comprises actuation means adapted to generate in synchronism a switching of the distributors (16, 17) so as to invert the function of the housings (12) and of the pockets (15).

22 Claims, 9 Drawing Sheets

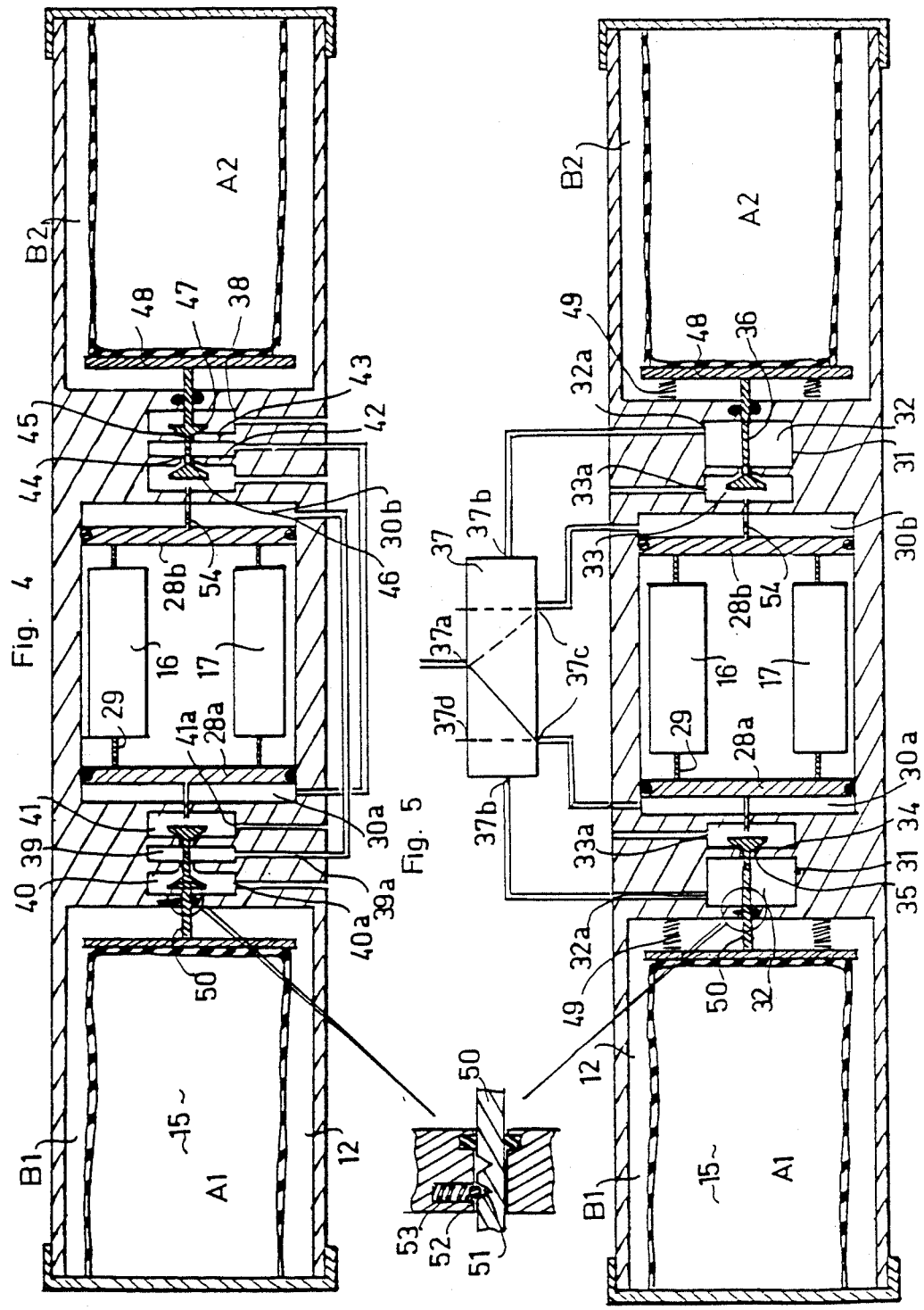

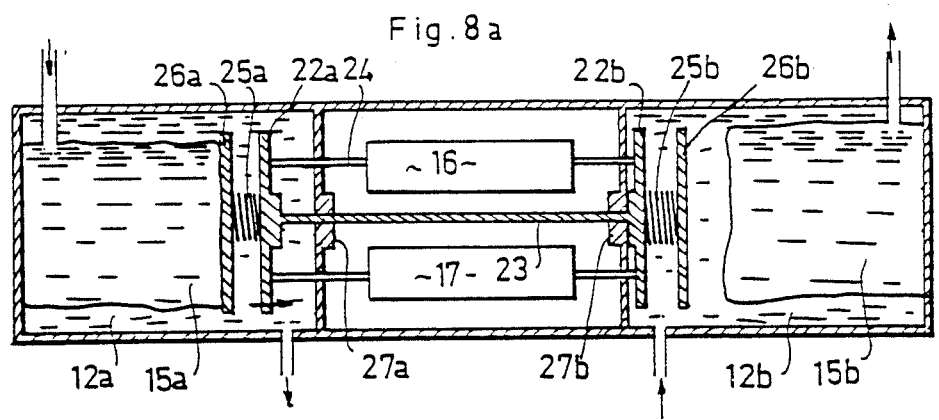
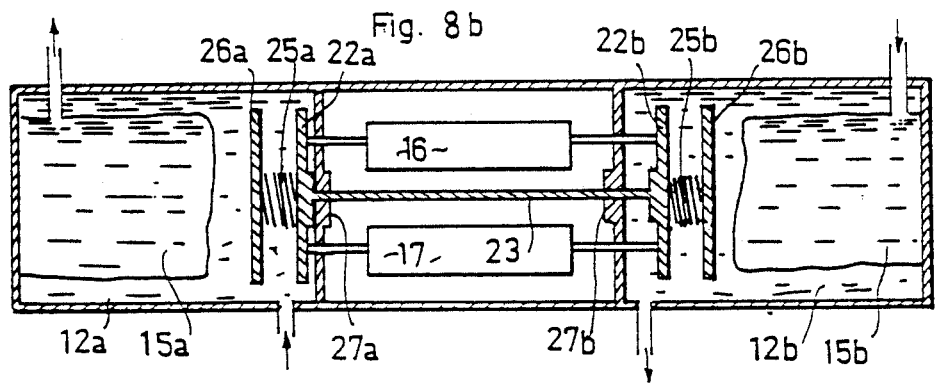
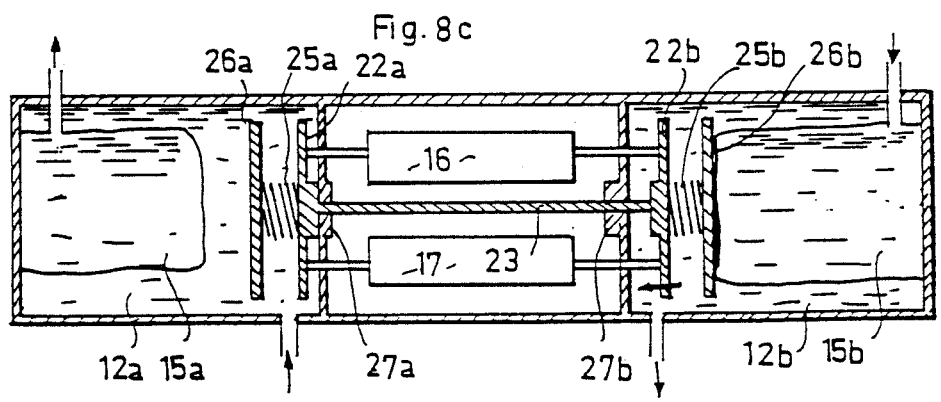

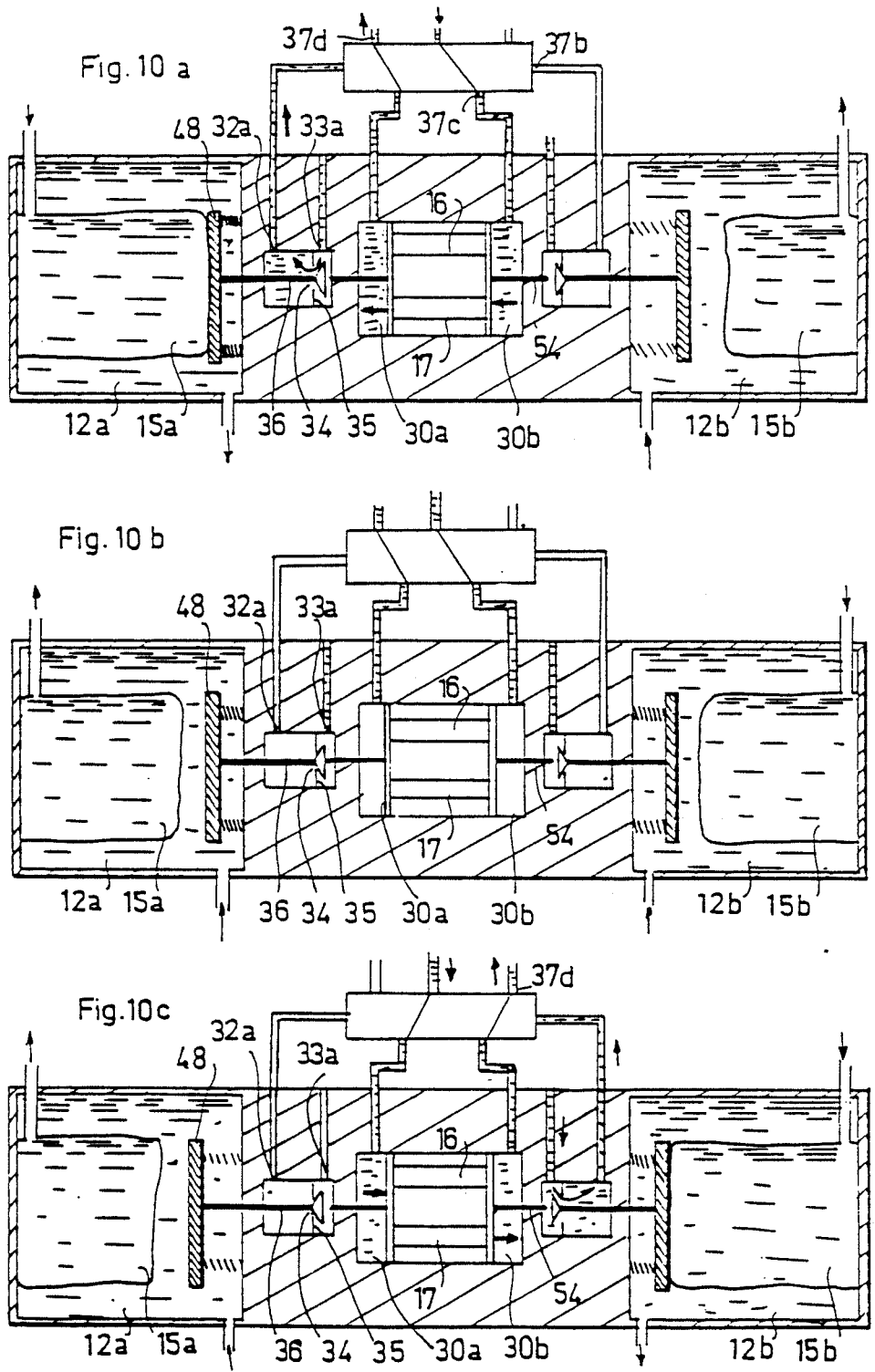

APPARATUS FOR INJECTING A FLUID INTO A NETWORK

The invention relates to an apparatus permitting the injection of a fluid into a distribution network. The invention is applied in particular for the injection of liquid or solid fertilizer, or phytosanitary products into irrigation or adduction networks, or even for the injection of maintenance solutions into micro-irrigation networks.

Several types of apparatus for meeting this objective are presently available on the market.

A first apparatus operates dosing pumps which permit injecting a quantity of solution proportional to the flow of fluid to be treated, and continuously while the fluids are available. However, these dosing pumps have a major disadvantage of requiring a supply of electricity. In effect, other than the costs of investment and exploitation, the need for a feed source of electric power makes problematic the use of dosing pumps in the many regions which are completely void of electric distribution networks. Moreover, these dosing pumps comprise a significant number of moving parts (flap valves, pistons . . . ) which are subject to premature wear and which calls for a permanent stock of replacement parts and qualified personnel.

To overcome these inconveniences, several types of apparatus operating without electricity have been developed.

The most rudimentary apparatus comprises a venturi nozzle having divergent cones inserted into the conduit system for the fluid to be treated. This nozzle creates a reduced pressure which permits obtaining, at a given level in the cone, a pressure in the piping system less than atmospheric, and may thus allow the aspiration of the solution to be injected, if the feed conduits for the solution is judiciously connected. This apparatus presents the advantage of not having any moving pieces. However, it presents two major disadvantages. First, the dilution ratio is proportional to the square of the speed of the principal fluid and not to the flow of this fluid, and is therefor not constant. This apparatus creates, furthermore, very significant pressure drops which may absorb up to 70% of the energy of the fluid to be treated. More elaborate devices have thus been developed, for overcoming these drawbacks.

One of these devices comprises a hydraulic injector for which the proportion of the solution to be injected is constant and is obtained by the alternating movement of a volumetric hydraulic piston. The cadence of the piston and thus the hourly volume of solution injected are controlled by means of a micrometer screw. This apparatus, besides its autonomy, permits injection of a solution, continuously, while the motive fluids are available. However, the quantity of fluid injected into the principal network is constant (except for the manual intervention acting on the micrometer screw) and do not take into account the variations in pressure or in flow rate of the principal fluid. Further, this apparatus comprises numerous moving pieces which are subject to premature wear.

For overcoming the first inconvenience of this apparatus (non-constant dilution ratio), there is also available on the market a proportional doser comprising a primary piston provided with two flag valves alternatively closed and opened during movement of the piston. This doser being inserted into the piping system of the fluid to be treated, the cadence of the piston is thus a function of the flow of this fluid. In other words, this piston includes in its prolongation, a small pump comprising a plunger piston which permits aspirating and introducing the treatment product into the piping system of the fluid to be treated. The strokes of the principal piston and therefor the plunger piston are thus proportional to the flow rate and the dilution ratio remains constant. However, while this type of apparatus appears to perform for installations having low flow, it presents numerous disadvantages when it is used for significantly sized installations. In effect, a large flow entails a very rapid cadence of the piston and as a result problems of wear, significant loss of pressure, and finally a poor operation of the apparatus. This doser is thus confined to installations with low flow, into which it is introduced in spite of relatively large pressure losses.

Another apparatus seeks to reduce moving mechanical parts and is achieved by means of the combination of a mixer and a proportioning element. The mixer comprises a barrel provided with an internal pocket filled with the solution to be injected. This barrel is provided with a feed inlet connected to the distribution network of the fluid to be treated, while the internal pocket is connected, by means of a conduit introducing a predetermined pressure drop, to the distribution network for the fluid to be treated, downstream of the injection point permitting feed from the barrel. The filling of the barrel which generates draining of the pocket thus permits injecting into the distribution network a quantity of solution as a function of the pressure drop introduced through the evacuation conduit for this solution. The combination of this mixer with a proportioning element inserted in the principal distribution network and adapted to introduce a known loss of pressure, thus permits injecting a sizeable quantity of solution proportional to the flow of the fluid to be treated. In effect, it suffices to use an evacuation conduit for the solution to be injected introducing a pressure loss proportional to that introduced by the proportioning element. It should, however, be noted that the quantity of solution injected is only "practically proportional" to the flow of the principal fluid, for the reason that comparisons between the losses of pressure are realized on fluids of different viscosities (fluid, solution). Moreover, and especially, this apparatus presents a major drawback of not permitting a continuous use in the installation. In effect, its independence is a function of the capacity of the solution to be injected in the barrel, which requires stopping the installation for changing or refilling this barrel after a certain time of use.

The present invention proposes to provide a new apparatus for the injection of a solution into a fluid distribution network which does not have the disadvantages of known apparatus.

The primary object of the invention is thus to provide an apparatus operating independently without electricity and permitting continuous injection of a fluid into a distribution network, with a rigorously constant injection ratio.

Another object of the invention is to provide an apparatus very simply conceived and very reliable, without moving mechanical parts.

Another object of the invention is to provide an apparatus only involving a small consumption of water, on the order of one volume of water per volume of fluid injected.

Another object of the invention is to provide an apparatus permitting a substantially instantaneous modification of the injection ratio.

Another object of the invention is to provide an apparatus for operating at very low pressures and only introducing very slight pressure drops.

Another object of the invention is to provide an apparatus which is easily transportable, of which the parallel branching into a network is substantially instantaneous.

Another object of the invention is to provide an apparatus with great chemical inertness, espceccially unaffected by agricultural chemical agents.

To this end, the apparatus of the invention comprises, in the first case, and injector intended to inject a fluid into a network and comprising:

a first hermetic enclosure divided internally into two chambers (A1, B1) of variable volume but having a constant total volume, each of said chambers being provided with an opening for the passage of fluid, A second hermetic enclosure divided internally into two chambers (A2, B2) of varibale volume but having a constant total volume, each of said chambers being provided with an opening for the passage of fluid, a first switchable distributor having at least one inlet for fluid to be injected, at least one outlet for fluid to be injected and two fluid passage openings, said distributor being adapted to present two states, one state in which the inlet and the outlet for the fluid to be injected is found respectively in communication with one and the other opening and a state in which these communications are reversed, a second switchable distributor having at least one auxiliary fluid inlet, at least one auxiliary fluid outlet and two fluid passage opening, said distributor being adapted to present two states, one state in which the inlet and the outlet for the auxiliary fluid is found respectively in communication with one and the other opening and a state in which these communications are reversed, conduit means connecting the opening of one of the chambers (A1, B1) of each enclosure and one opening of the first distributor in such a manner that, in one state of said distributor, one of said chambers A1 is being filled with fluid while the other chamber A2 is being emptied, and in the other state, the role of the chambers is reversed, conduit means connecting the opening of the other chamber (B1, B2) of each enclosure and an opening of the second distributor in such a manner that, in one state of said distributor, one of said chambers B2 is filled with fluid while the other chamber B1 is emptied, and in the other state, the role of the chambers is reversed, actuating means for the two distributors, adapted to generate, in synchronization, their switching between their two states, in order to arrange them in two configurations in which said states are reversed:

one configuration in which one chamber A1 of one enclosure is filled and the other chamber B1 of said enclosure is emptied while in the other enclosure the chamber B2 is filled with fluid and the chamber A2 is emptied, another configuration in which the role of the chambers (A1, A2) is reversed along with the role of the chambers (B1, B2).

By switchable distributor is means any system such as flap valves, multipath gate valves or slide valve distributors capable of permitting a distribution of fluid.

According to one preferred embodiment, one of the chambers (A1, A2) of each enclosure is formed by a deformable sealed pocket or pouch adapted to occupy a variable volume in the interior of said enclosure, the other chambers (B1, B2) of each enclosure being formed by the volume of said enclosure exterior to that of the pocket.

(In the description which follows in order to facilitate understanding, the volume of the enclosure, exterior to the pocket, will be called the enclosure and will be joined to the second distributor feeding the auxiliary fluid; in parallel, the internal pockets will be connected to the first distributor feeding the fluid to be injected. It should be understood that the reverse configuration would yield precisely the same results. Moreover, the terms "upstream" and "downstream" refer to the direction of flow of the fluids.

Thus, this injector permits injecting the fluid to be injected contained in one pocket in the network of fluid to be treated, while simultaneously the other pocket is filled with fluid to be injected. The actuating means permits inversion of this mechanism when the pocket being filled reaches a predetermined rate of filling or when the quantity of fluid contained in the pocket being emptied becomes less than a given value. The injector is thus completely autonomous and may thus function indefinitely as long as the motive fluids are available.

Moreover, the operation does not require any electric connection and its frequency of switching, a function of the internal volume of the pockets, is very slow and does not lead to sollicitations which are able to cause premature wear of the different moving parts (distributors, actuating means, pockets . . . ).

According to one preferred embodiment, the distributors assure the feed of auxiliary fluid of one of the enclosures and simultaneously the emptying of the second enclosure, the other distributor, arranged in parallel and simultaneously assuring the filling with fluid to be injected from the internal pocket of the enclosure being emptied and simultaneously the emptying of the internal pocket of the enclosure being filled.

Further, the auxiliary fluid feeding the enclosures generally arises from a tap into the network and it is housed in a feed passageway. The fluid to be injected is injected into the network by the intermediary of an evacuation conduit connected to the network, downstream from the feed passage of the auxiliary fluid.

The operation of the injector is thus caused by the difference in pressure existing between the points of connection.

The changing of the configuration of the distributors is additionally accomplished through the intermediary of actuating means, either mechanical or hydraulic, adapted to permit a full and complete commutation or switching, such as will be described hereinafter, in such a manner as to avoid making an accidental connection of the different fluid inlets and outlets which could create a bockage of the injector.

In order to permit injection of a flow of fluid proportional to the flow in the principal network, this injector may advantageously be associated, according to another embodiment of the invention, with a proportioning module inserted in the network of the fluid to be treated downstream of the connection of the feed conduit for the auxiliary fluid and upstream of the connection of the evacuation conduit of the fluid being injected, the proportioning module being adapted to introduce, for a given flow of fluid to be treated, a pressure drop of a predetermined value. According to the present invention, the feed conduit for the auxiliary fluid is then adapted to introduce a pressure drop proportional to the pressure drop introduced by the proportioning module, in a predetermined ratio to this pressure drop.

The flow of fluid to be treated diverted through the auxiliary fluid conduit is thus proportional to the flow of this fluid to be treated. Thus, if this flow of fluid should increase or decrease, the diverted flow increases or decreases in the same proportions. The flow of fluid injected being, by the design of the apparatus, strictly identical to the flow of auxiliary fluid feeding an enclosure, this injector thus permits obtaining a constant injection ratio.

According to a preferred embodiment, the proportioning module is formed of a bundle of hollow tubes of predetermined cross section; in the tubing system of the auxiliary fluid feed is inserted a proportioning element of a length and passage cross section adapted to confer a hydraulic behavior proximate to that of the tubes of the bundle in such a manner as to introduce a pressure drop permitting diversion of a given flow of fluid to be treated.

The determination of the injection ratio is thus realized by comparing two identical fluids of the same viscosity circulating in the tubes of similar hydraulic behavior.

The use of an auxiliary fluid feed conduit introducing a pressure drop approximately equal to the pressure drop introduced by one of the tubes of the proportioning module thus permits obtaining a substantially constant injection ratio.

The precision thus obtained is generally sufficient for the majority of installations. It may, however, be improved by integrating into the calculation of the pressure drop introduced by the proportioning element a coefficient relative to the presure drops introduced by the auxiliary fluid feed conduit itself, and by the injector at the level of the pockets, the distributors, etc.

In order to permit a continuous functioning of the hydraulic installation to which the device is connected, the device comprises, according to another characteristic of the invention, means for storage and feed of the fluid to be injected comprising means for storing this solution or a soluble product adapted to be capable of being replenished without the need to stop the apparatus.

According to a preferred embodiment, the storage means comprises an un-closed reservoir arranged in such a manner as to be under pressure with respect to the distribution network. This reservoir may thus be recharged without introducing any difficulties to the operation of the installation. It should be noted that in addition to the simplicity of this manner of storage it permits acquisition of sizeable volumes for storage at very low cost.

Moreover, the fact of positioning the reservoir under pressure with respect to the injector itself permits feeding the injector with a fluid the feed pressure of which is sufficient to permit the refilling of the internal pockets of the enclosures and bringing about the switching of the distributors, as will be seen hereinafter.

According to another preferred embodiment, the storage means for the solution may be comprises of at least one closed reservoir containing a soluble product and provided with a fluid inlet connected to a fluid feed conduit and a fluid outlet connected to one of the distributors by means of suitable conduits.

These two embodiments permit the use of primary materials in a more convenient solid form and only require a limited volume for their storage.

Generally the apparatus is provided with two reservoirs arranged in series and comprising by-pass means adapted to permit isolation of one or the other reservoir.

This second embodiment also permits obtaining a saturated solution under pressure, permitting an easy refilling of the internal pockets of the enclosures of the injector and the switching of the distributors. These reservoirs may, additionally, be used either in series or with one for relief of the other, this latter solution offering the possibility of proceding with the filling of one reservoir without interruption of the operation of the installation.

According to another characteristic of the invention, these closed reservoirs may be used in association with:

a proportioning module inserted into the solution tubing means and adapted for introducing, for a given flow of solution, a pressure drop of a predetermined value, a diversion conduit connected, at one end, to the fluid feed conduit, upstream of the reservoirs and, at the other end to the solution conduit means, downstream of the proportioning module, the diversion conduit being adapted to introduce a pressure drop proportional to the pressure drop introduced by the proportioning module, in a predetermined ratio with this pressure drop.

These arrangements permit solving the problems of instability of the solutions due to variations in temperature. In effect, the solubility of a product being a function of temperature, a variation in temperature may cause a precipitation and crystallization of the products dissolved in a saturated solution resulting in deposits being formed in the conduits and, in the long term, an obstruction of the tubing system. These problems are primarily found when the installations are taken out of operation.

The addition of a proportioning module and a diversion conduit permits obtaining a solution of which the concentration is precisely determined and fixed at a value, below saturation, permitting an assurance against any risk of crystallization.

The invention described in general terms hereinabove will be better understood upon reading the description which follows and upon consideration of the annexed drawings which present by way of non-limiting examples several embodiments of the invention; in the drawings which form an integral part of the present description:

FIG. 4 is a schematic sectional view of a second embodiment of the actuating means for a distribution system, the nozzles connected to the device not being shown;

FIG. 5 is a schematic sectional view of a third embodiment of the actuating means of the distribution system, the nozzles connected to the device not being shown;

FIGS. 8a, 8b, 8c illustrate the operation of the actuating means comforming to the first embodiment of these switching means;

FIGS. 10a, 10b, 10c illustrate the operation of the actuating means according to the third embodiment of the invention;

(In the description which follows, in order to facilitate understanding, the apparatus will be considered as injecting a solution and connected to a hyraulic distribution network.)

Figure 1:
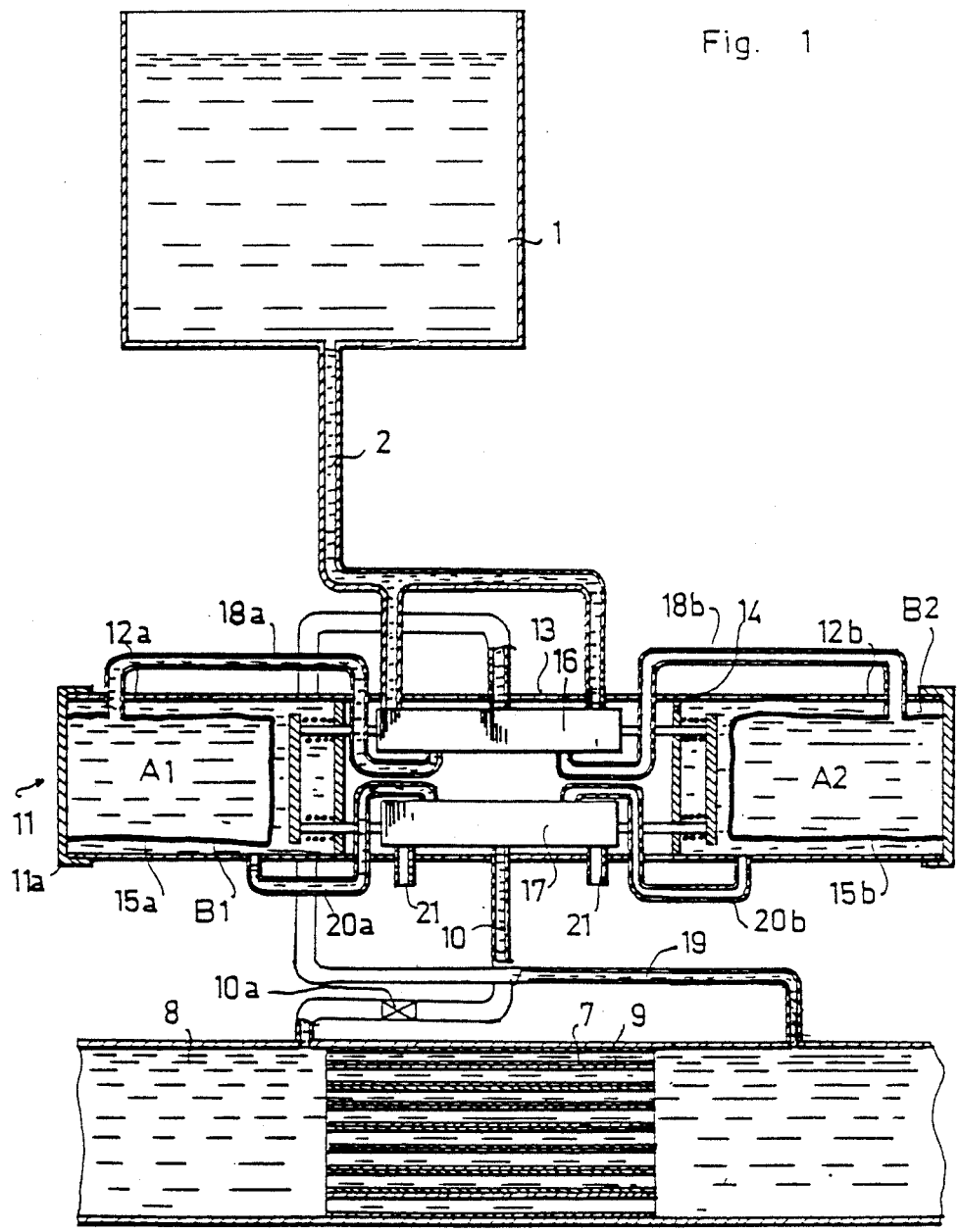
FIG. 1 is a general schematic sectional view of an apparatus conforming to the invention in which the storage reservoir for the solution is shown on a reduced scale with respect to the other constituent parts of the apparatus.

The apparatus for the injection of a solution into a hydraulic distribution network, shown for example in FIG. 1, comprises means for storing and feeding a solution to be injected, a hydraulic injector intended to permit injection of the solution into a hydraulic distribution network, and a proportioning module inserted in this hydraulic feed network and permitting obtention of a constant injection ratio.

The storing and feeding means for the solution to be injected comprise an open reservoir 1 arranged at a predetermined height above the hydraulic injector 11 in such a manner as to be under pressure with respect thereto. This reservoir is intended to be filled with a solution to be injected and is connected by the intermediary of a feed conduit for the solution 2 to the hydraulic injector 11.

Figure 2:
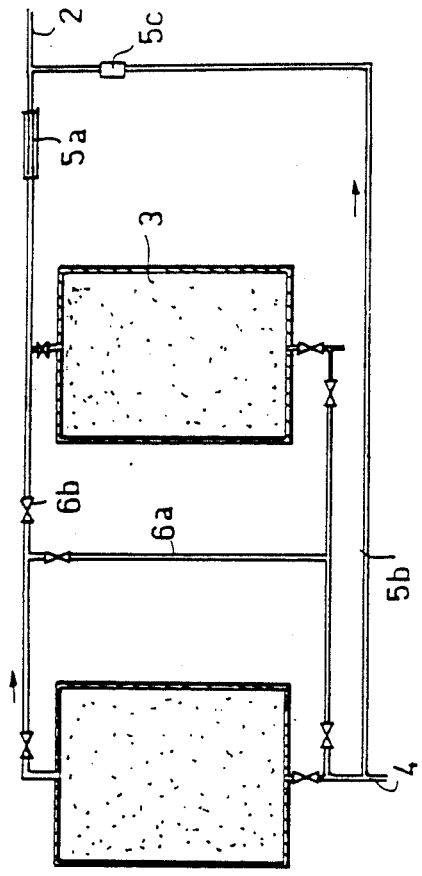
FIG. 2 is a schematic sectional view on reduced scale of a variation of the feed means and the storage means for the solution.

According to another embodiment (FIG. 2), this reservoir may be replaced by two closed reservoirs, such as 3 fed by an associated hydraulic feed network 4 and containing a product soluble in water and intended to be injected in the form of a solution. Each of these reservoirs is provided with a fluid inlet connected to the hydraulic feed network 4 and, opposite this inlet, a fluid outlet. This arrangement permits the circulation of the water in the reservoir in such a manner as to obtain a saturated solution of dissolved product.

These two closed resevoirs are arranged in series in such a manner as to be able to be used together. They may also be used, one for replacement of the other, due to a by-pass circuit 6a and a plurality of isolating valves such as 6b, permitting the isolation of one reservoir while assuring the circulation of water in the second reservoir and the feed to the hydraulic injector 11 of the solution to be injected.

Thus, which ever will be their manner of operation (one open reservoir or two closed reservoirs), the storing means authorizes a continuous operation of the injection apparatus.

In the embodiment corresponding to the closed reservoirs 3, the storing means for the feed material may also be associated with a proportioning module 5a, comprising a bundle of hollow tubes inserted in the solution feed conduit 2 in such a manner as to introduce, for a given flow of solution, a predetermined pressure drop. Associated with this proportioning module, the apparatus is also provided with a diversion conduit 5b, connected at one end to the hydraulic feed network 4 and at the other end to the solution feed conduit 2 downstream of the proportioning module. Into this conduit 5b is inserted a proportioning element 5c adapted to introduce a pressure drop proportional to the pressure drop introduced by the proportioning module 5a.

This conduit thus permits a diversion of a predetermined portion of the flow of water feeding the reservoirs 3 and therefor a modification of the concentration of the solution of the product to be injected. The interest resides in the possibility of providing an unsaturated solution of a predetermined concentration. In effect, the solubility of a product being a function of the temperature of the water, a variation of this temperature may cause a crystallization of the dissolved product when the solution is saturated.

It should be noted that this phenomena is frequently discovered when the installation is out of operation. The addition of a given flow of water in the saturated solution leaving the reservoirs thus permits lowering of the concentration of the dissolved product and therefor elimination of any risk of crystallization and attendant obstruction of the various conduits.

The second element included in the injection device comprises a proportioning module 7 inserted into the feed network 8 in which the solution is injected. This module comprises a bundle of hollow tubes 9 of a predetermined cross-section and length. This proportioning module 7 may particularly be formed of a bundle of tubes or conduits of diverse cross sections (square, rectangular, hexagonal . . . ) or thin sheets.

These hollow tubes may also have, internally, restricting sections generating compression-expansion phenomena in liquid streams. These restrictions, for example baffles, permit obtaining a similar pressure drop across proportioning modules which are much shorter and more compact.

These proportioning modules are designed in such a manner as to introduce a slight pressure drop, essentially between 0.025 and 0.2 bars, a pressure drop essentially proportional to the length of the bundle and the speed of the water.

In order to permit the injection of a flow of solution proportional to the primary hydraulic flow, this module is used in association with an auxiliary fluid feed conduit 10 connected at one end to the hydraulic distribution network 8 upstream of the proportioning module and at the other end to the hydraulic injector 11. Into this conduit 10 is inserted a proportioning element 10a of which the cross section of the passage and the length are adapted to confer upon the device a hydraulic behavior approximately the same as each tube of the bundle of the proportioning module 7. This element 10a thus permits a diversion of a part of the hydraulic flow in a predetermined ratio of that flow. This ratio of flows presents additionally the advantage of remaining constant regardless of the variations of the flow in the hydraulic network 8. Each variation of flow generates, in effect, a variation in the same proportions of the flow of fluid diverted by the conduit 10.

The association of the proportioning module 7 and the feed conduit 10 provided with its proportioning element 10a, thus permits feeding the hydraulic injector with an auxiliary fluid of which the flow varies in the same proportions as the flow of the hydraulic network 8. The flow of solution injected into this hydraulic network 8 being strictly identical to the flow of auxiliary fluid, the proportioning module thus permits obtaining a constant injection ratio.

In order to modify this injection ratio, it is sufficient to use feed conduits 10 provided with proportioning elements 10a with different characteristics. In practice, these conduits 10 are easily interchangeable and are initially calibrated so as to provide an extended range of different injection ratios.

The third element forming a part of the injection device comprises a hydraulic injector 11. This injector comprises a hollow cylindrical body divided internally into three compartments 12a, 12b, 13 by two sealing walls 14: two peripheral compartments 12a, 12b each comprise a hydraulic enclosure and a central compartment 13.

The two longitudinal extremities of this cylindrical body and thus the enclosures 12a, 12b are closed by means of removable closures such as 11a. On the internal face of this closure is hermetically fixed the end of a sealed pocket or pouch 15a, 15b which thus defines in the interior of the enclosure 12a or 12b a chamber (A1, A2) of a variable volume isolated hermetically from the rest of the enclosure. The extremity of these pouches may alternatively be fixed hermetically to the separation wall 14. The choice between one or the other means of attachment determines the mode of operation of the injector, as will be seen hereafter. The volume of each enclosure 12 external of the pouch 15 determines, as for itself, a chamber (B1, B2), the capacity of which is complementary to the volume of the pouch. In addition, each of the enclosures 12a, 12b and each of the pouches 15a, 15b are provided with an opening for the passage of fluid.

The materials selected for this injector are chosen to possess a significant chemical inertness, and especially to be unaffected by agricultural chemical agents. To this end, the body of the injector may be made of stainless steel and the pouches of polyethylene. Further, this injector, the length of which is on the order of one meter, is therefor easily transportable.

The central compartment 13 encloses therein two five part, two position switchable distributors 16, 17 of a slide valve type.

The first distributor 16 comprises:
two fluid inlets connected by means of solution feed conduit 2 to the storage means 1 or 3 for this solution,
two fluid passage openings connected by means of transfer conduits 18a, 18b to the openings in the pouches 15a, 15b,
a fluid outlet connected by means of an emptying conduit to the hydraulic distribution network 8 downstream of the proportioning module 7.

The second distributor 17 comprises:
a fluid inlet connected by means of an auiliary fluid feed conduit 10 to the hydraulic distribution network 8,
two fluid passage openings connected by means of transfer conduits 20a, 20b to the openings in the enclosures 12a, 12b,
two fluid outlets 21 opening to the outside air.

Each of these slide valve type distributors 16, 17 is adapted to present two states in which they place in communication, in a classical manner, on one hand a feed conduit 2 (or 10) with one of the transfer conduits 18a, 18b (or 20a, 20b) and on the other hand, the other transfer conduit 18a, 18b (or 20a, 20b) with an evacuation conduit 19 (or 21).

These two distributors 16, 17 may be arranged parallel, one beside the other. It is also possible to arrange them in end-to-end fashion, their respective valves being connected by one of their extremities. This second possibility may present advantages with respect to the clearance of these distributrors and assure a precise synchronization of operation.

Due to the principle of the pouches and the use of valved distributors, this injector is thus designed to introduce slight pressure drops localized principally in the distributors 16, 17. These pressure drops are also easily quantifiable and essentially constant over the range of flow of the solution to be injected. At the time of the selection of the proportioning element 10a of the auxiliary fluid feed conduit 10, these pressure drops may thus be introduced into the calculations in a constant form. Thus for obtaining a given injection ratio, three known facts enter into the computation: the pressure drop introduced by the auxiliary fluid feed conduit 10 and its proportioning element 10a, the pressure drop introduced by the injector 11 and the concentration of product dissolved in solution. The two latter facts being generally fixed at the time of starting the installation, it is thus possible to modify the injection ratio at any moment by changing the conduit 10, an operation which is essentially instantaneous.

Figure 7A:
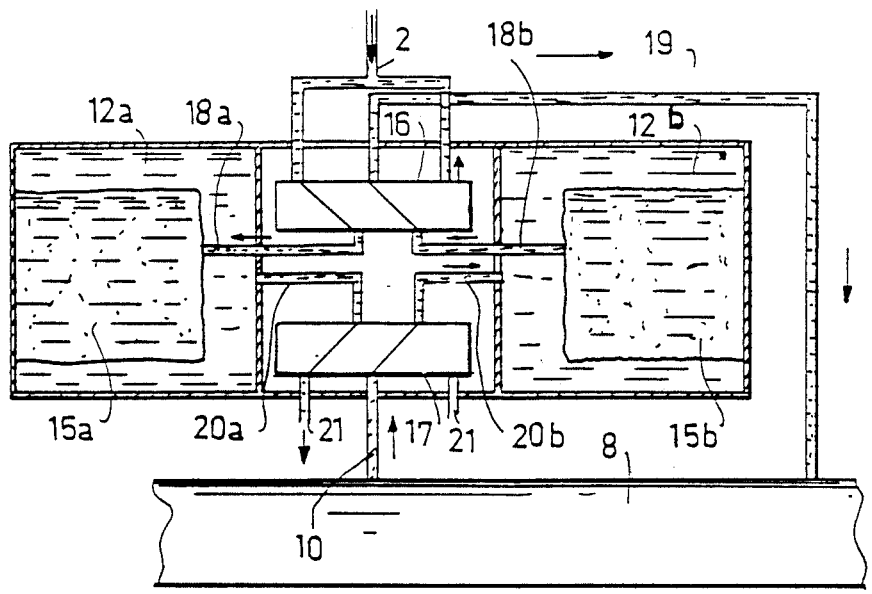
FIGS. 7a and 7b illustrate the operation of two distributors appurtenant to the apparatus according to the invention.
Figure 7B:
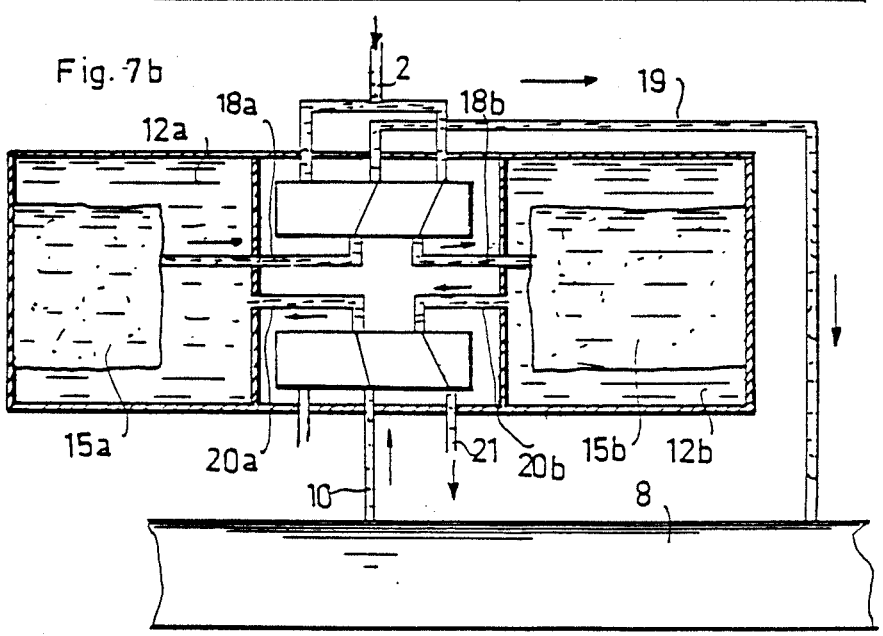

The operation in parallel of these distributors is explained hereafter with reference to FIGS. 7a and 7b.

In a first state (FIG. 7a), the distributor 16 places in communication the solution feed conduit 2 and one pouch 15a by means of the transfer conduit 18a. Simultaneously, it places in communication the other pouch 15b and the solution evacuation conduit 19 through the transfer conduit 18b.

In parallel arrangement, the distributor 17 is in the state in which it places in communication the auxiliary fluid feed conduit 10 and the enclosure 12b, in which the internal pouch 15b is in the process of being emptied, the intermediate transfer conduit 20b. Simultaneously, it places in communication the other enclosure 12a with an evacuation outlet 21 of this distributor.

Thus, while one of the pouches 15b is emptying into the hydraulic feed network 8 due to the filling of the enclosure 12b, the second pouch 15a is being filled with solution while forcing out the water contained in the enclosure 12a.

The emptying of the pouch 15b into the feed network 8 is thus achieved because of the difference in pressure existing between the points of connection to the principal network 8 of the auxiliary fluid feed conduit 10 and the solution evacuation conduit 19. Further, by the same principle of operation, the flow of solution injected into the feed network is precisely the same of the flow of auxiliary fluid feeding the enclosure 12b. This flow of injection therefor varies in the same ratios as the flow in the hydraulic network 8.

Moreover, the consumption of water of this injector is thus equal to a volume of water per volume of solution injected. (With the exception of the slight consumption of water necessary to the operation of the actuating means described hereafter.)

Futher, the filling of the pouch 15a with solution is achieved due to the pressure of the feed network 2 for this solution (open reservoir 1 under pressure or feed pressure of the fluid feeding the closed reservoirs 3) and the placing under atmospheric pressure of the enclosure 12a at the time of filling to this pouch. The solution feed network 2 is, further, calculated to permit a filling of the pouch 15a more rapidly than the emptying of the pouch 15b in such a manner as to avoid a lowering or interruption of the flow of injected solution, without achieving too rapid a refilling thereof, which would necessitate a high frequency of switching and over time a blocking of the apparatus.

The switching of the device permitting assurance of its operation continuously is controlled by actuating means which are described hereafter with respect to FIGS. 3, 4, 5, 6. Under the action of this actuating means, the distributors 16, 17 are switched between their two states in such a manner as to permit the refilling of the pouch and the emptying of the corresponding enclosure, and simultaneously the emptying of the pouch and the filling of the corresponding enclosure (7b).

In the attached drawings, the actuating means is acted upon when the pouch in the process of being filled attains a given rate of filling. This is due to the position of this pouch of which the extremity is fixed upon the removable cover 11a of the injector. The switching is thus achieved due to the pressure of the solution feed network 2.

Another solution is possible, comprising fixing the end of the pouch 15 on one sealing wall 14, as indicated above. In this case, the actuating means are actuated when the volume of the pouch being emptied becomes less than a given value. The switching is then achieved due to the difference in pressure existing between the points of connection, to the principal network, of the auxiliary fluid feed conduit 10 and the evacuation conduit 19 of the solution.

It should also be noted that this second solution requires designing the different networks in such a manner that the emptying of one pouch will be more rapid than its filling in order to avoid too great rates of filling and an attendant deterioration of these pouches or a blocking of the apparatus.

FIGS. 3, 4, 5, 6 represent different embodiments of the actuating means permitting, for a given rate of filling of one pouch, the inversion of the position of the valve of each distributor 16, 17. These different actuating means would be identical if the pouches 15 were fixed to the sealing walls 14. In this case, they would then be contained at the interior of these pouches.

Figure 3:
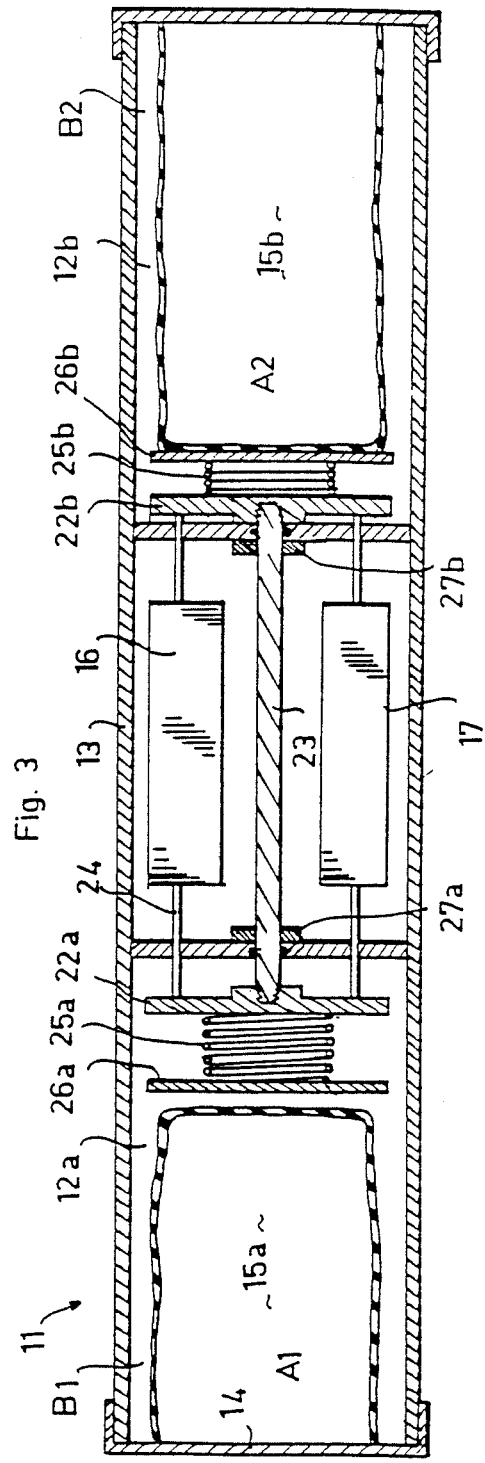
FIG. 3 is a schematic sectional view of a first embodiment of means for actuating a distribution system appertaining to an apparatus in accordance with the invention (the different nozzles connected to the device not being shown)

The actuating means shown in FIG. 3 comprises operating means for the valve of each distributor 16, 17, adapted to operate the valves in synchronism in such a manner as to position the distributors in one or the other of their states under the action of a force exerted by the extremity of a pouch 15 when it is filled (or when it becomes empty if it is fixed to the sealing wall 14).

This operating means is also associated with retaining means adapted to exert a retaining force tending to keep each valve in one of its operating positions while the force exerted by the pouch 15 is less than the retaining force and to permit the displacement of the valves in the opposite case.

The operating means comprises displacement means securely attached to the end of each valve and formed by two plates 22 of a magnetic material, each arranged in one enclosure 12 and connected together by a connecting pin 23. These plates are further provided on opposite sides of each distributor 16, 17 with rods such as 24 extending orthogonally to their plane surface in such a manner as to traverse the sealing wall 14 and having an extremity fixed to the end of the valve so as to extend axially therefrom. At the time of their displacement, these plates thus generate a synchronized displacement of the valves of each distributor 16, 17. It will be appreciated that the use of two distributors disposed in axial alignment will eliminate the rods 24, the connecting pin 23 being able to be directly fixed to the ends of the valves.

The operating means also comprises elastic return means comprising springs fixed on one end to a plate 22 and on the other end to a support member 26 of a circular shape disposed in each enclosure 12 in such a manner as to serve as a stop at one end of the pouch 15 of that enclosure, when the filling thereof is completed.

The retaining means comprises two magnets 27a, 27b mounted on the separation wall 14 so as to be able to exert an attractive force on one plate 22a, 22b when it is proximate the magnet.

The structure of the actuating means having been hereinabove described, the operation thereof will be described in greater detail with reference to FIGS. 8a, 8b, 8c.

Initially (FIG. 8a), the plates 22a, 22b are positioned so that one of the two (for example 22b) is placed against the magnet 27b situated opposite thereto, the second plate (for example 22a) being separated from the magnet situated opposite thereto 27a. These positions correspond to one state of the distributors 16, 17 permitting filling of the internal pouch 15a of the enclosure 12a in which is situated the plate 22a.

When the pouch 15a becomes filled, the end thereof comes into contact with the pressure plate 26a. Under the influence of the pressure exerted by the pouch 15a, this plate compresses the spring 25a which thus stores up the energy until the force exerted by the pouch becomes greater than the magnetic retaining force exerted by the magnet 27b on the other plate 22b, causing the separation of the plate 22b and the magnet 27b. The magnetic force exerted between this plate 22b and this magnet 27b diminishes very quickly with the distance and the restoration of the energy stored by the spring 25 associated with the plate 22a, at the time of its compression, permitting a displacement of the connecting pin-plate assembly 22a, 22b, 23 and at the same time, in synchronism, the rods 24 associated with each plate until the plate 22a is placed against the magnetic influence of the magnet 27a; there is thus obtained a complete and total switching, and further, the actuating means are "armed" for the reverse movement. The distributors of which the valves are solidly joined to the rods 24 have therefor changed state in such a manner as to permit the emptying of the pouch 15a and the filling of the pouch 15b.

In the intermediate phase (FIG. 8b) when each pouch is either partially empty 15a, or partially filled 15b, the pouch 15a being emptied no longer exerts any force upon the support member 26a, while the pouch in the process of being filled 15b does not exert any offsetting force on the support member 26b. Each plate 22 thus remains in the position established at the time of the preceding switching and until the pouch being filled comes into contact with the pressure plate 26b thereby offsetting the same and causing a new changing of the state of the distributors 16, 17.

The actuating means described hereabove permit a synchronized changing of the state of the distributors 16, 17 with a full and total switching while thereby avoiding establishing accidentally a communication between all of the fluid inlets and outlets which would cause a stopping of the apparatus. Further, this actuating means permits the installation to operate indefinitely while the motive fluids are available.

Figure 6:
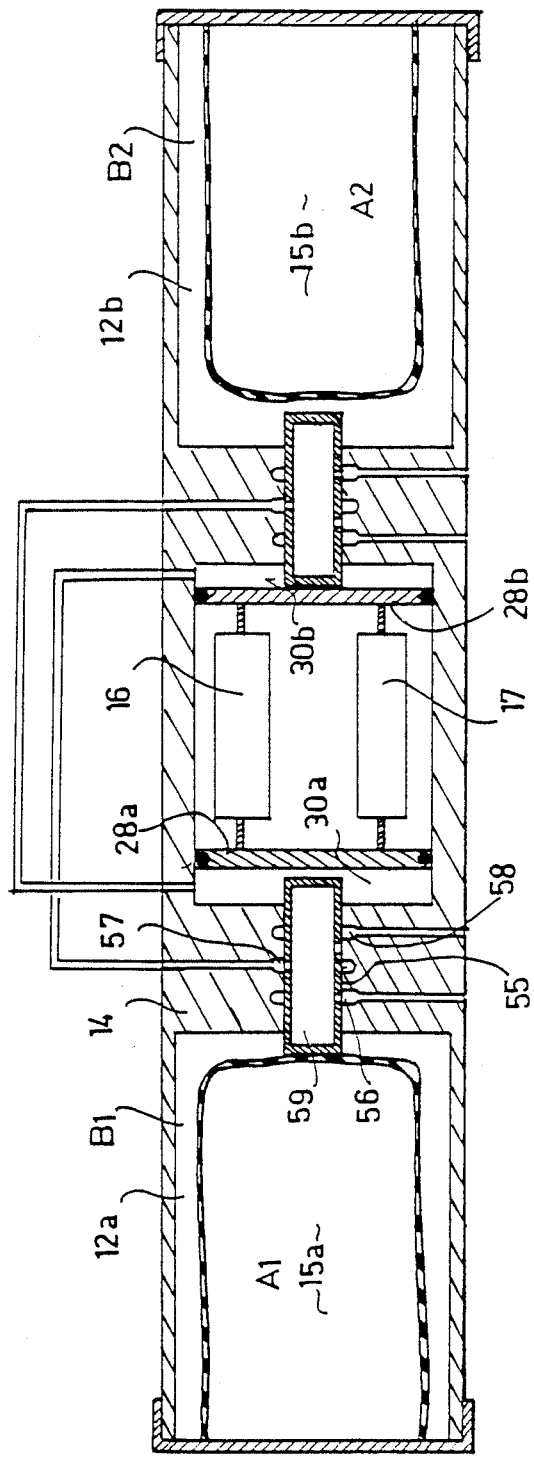
FIG. 6 is a schematic sectional view if a fourth embodiment of the actuating means of the distribution system, the nozzles connected to the device not being shown.

FIGS. 4, 5 and 6 illustrate three other embodiments of actuating means.

These actuating means comprise displacement means for each valve, formed by two plates 28a, 28b movably arranged in the central compartment 13, on one side or ther other of the distributors 16, 17. These plates are provided, opposite each distributor 16, 17 with rods such as 29 extending orthogonally to their planar surface, and having one end fixed to the end of a valve so as to extend axially therefrom.

In order to permit their displacement, each of the plates 28a, 28b is associated with a sealed chamber 30 so that the plate forms a movable end wall. To this effect, each plate is provided on its periphery with an O-ring in order to preserve the hermeticity of the chamber at the time of displacement of the plate.

Each of the chambers 30 is provided with a fluid passageway connected to a distribution system (31-37; 38-47; 55-59) connected to control means adapted to permit the filling of one chamber (for example 30a) and simultaneously permit the emptying of the second chamber (for example 30b). This operation creates a sliding of the plates 28 on the interior of the chambers 30, and consequently a displacement of the valves of the distributors 16, 17 and a change of the state of the distributors.

FIG. 4 shows a first embodiment of the distribution system. In this embodiment, each distribution system is formed principally of an auxiliary distributor 38 arranged in the central compartment 13 near one chamber 30. This distributor comprises three internal compartments 39, 40, 41 separated by walls 42, 43 having an orifice 44, 45:

a central compartment 39 having a fluid passageway 39a connected to a chamber 30, a peripheral compartment 40 having one fluid outlet 40a emptying to the outside air, a peripheral compartment 41 having a fluid inlet 41a for an auxiliary fluid. It should be noted that this auxiliary fluid generally comes from a tapping into the distribution network 8.

Each auxiliary distributor 38 is also provided with an obturator or valve 46 having two oppositely directed points 47 and spaced a distance such as to permit the outflow of fluid through only one orifice 44 or 45 at a time.

FIG. 5 represents a second embodiment of distribution systems. In this embodiment, the distribution systems are principally formed of two auxiliary distributors 31 and one supplemental distributor 37.

The two auxiliary distributors 31 are arranged in the central compartment 13 near one chamber 30 and comprising two internal compartments 23, 33 separated by a wall 34 having a fluid outlet 32a connected to the supplemental distributor 37 while the second compartment 33 is provided with a fluid inlet (33a) connected to a feed conduit, the other end of which is generally connected to the distribution network 8. This distributor 31 comprises an obturator or valve head 36 having one point adapted to obstruct the orifice 35 formed in the separation wall 34.

The supplemental distributor 37 is also provided with a primary fluid inlet 37a connected generally to the distribution network 8, two secondary fluid inlets 37b connected to the outlets 32a of the auxiliary distributors mentioned above, two fluid passage openings 37c each connected to a chamber 30 and two fluid outlets 37d opening to the outside air.

This distributor thus presents, in a classic manner, two states in which the primary fluid inlet 37a is in communication with one or the other opening 37c, the other orifice 37c being in communication with a fluid outlet 37d. Additionally, the act of feeding one of the secondary fluid inlets 37b permits, due to a bi-stable reversing device, such as a conical spring (not shown), a changing of the state of the supplemental distributor.

The distribution systems (31-37; 38-47) described above in reference to FIGS. 4 and 5 are, additionally, associated with control means (48, 50, 54) adapted to control for a predetermined volume of the pouch 15 being filled (or being emptied) the feed of fluid into one of the chambers 30, while directing the emptying of the second chamber 30. There is thus obtained a sliding of the plates 28 in the interior of the chambers 30 and therefore a synchronized displacement of the valves of the distributors 16, 17.

These control means comprise, for each auxiliary distributor (31; 38) a support member 48 arranged in an enclosure 12, in such a manner as to serve as an abutment at the end of the pouch 15 internal to this enclosure, during the filling of this pouch. This support member 48 comprises on its face opposite to the pouch 15 a connection pin 50 extending orthogonally to that face, so as to pass through the separation wall 14; this connection pin is also provided with an end fixed on the end of the closure (36; 46) of the auxiliary distributor (31; 38).

In order to permit precisely defining two operative positions of this closure (36; 46) during this displacement, each distribution system includes positioning means 51, 52, 53 for each closure (36; 46).

This positioning means comprises two juxtaposed grooves 51, cut in the periphery of the connection pin 50 and a small ball 52 of such dimensions as to permit it to rest in each of these grooves in which it is maintained by means of a spring 53. It should be noted that by the term "ball" is meant any member able to be lodged and kept under pressure in a groove 51, for example a pawl or a pointer, etc. . . .

This positioning means may also be formed of a magnet arranged at the level of the separation wall 14, opposite the support member 48. These magnets thus permit exerting an attractive force which increases when the distance between the member 48 and this magnet decreases, that is in proportion to the filling of the pouch 15. Thus, for a given distance between the magnet and the plate member, the latter comes to rest against the magnet.

This positioning means thus defines two positions of operation of the closure (36; 46) of the auxiliary distributors (31, 38): first position, termed the open position, permitting feed to the chamber 30 (FIG. 4) or respectively of the supplemental fluid distributor 37 (FIG.5) and a second position, termed the closed position, closing this feed.

For the embodiment shown in FIG. 4, these two positions are equivalent, for the open position, for interrupting the flow of fluid between the fluid passage opening 39a and the fluid outlet 40a and, for the closed position, in permitting a flow of fluid between said outlet and opening.

It should be noted that, due to the presence of the supplemental bi-stable distributor 37, the device shown in FIG. 5 is necessarily found in a configuration authorizing the filling of the chamber 30 and simultaneously the emptying of the second chamber 30 and thus permitting a correct positioning of a valve of the distributor 16, 17.

By contrast, the device shown in FIG. 4 may be found, upon starting of the installation, in a configuration where the two auxiliary distributors 38 prevent feed or emptying of the chambers 30, the valve of each distributor 16, 17 then being found in an intermediate position between the operative positions. To remedy this state which would create a blockage of the apparatus, it will be provided with initial displacement means (not shown) permitting the positioning in an inverse manner of the closures 46 of each auxiliary closure 38.

The control means of the obturator of each auxiliary distributor, (31; 38) comprises return means adapted to cause a displacement of this obturator from its open position toward its closed position.

This return means comprises a projection 54 extending orthogonally with respect to one of the faces of a movable plate 28 in such a manner as to protrude with respect to the end of the corresponding chamber 30. Thus this projection 54 is adapted to come into contact with and exert a force upon the extremity of the obturator (36, 46) when a displacement of the plate 28 causes the emptying of the corresponding chamber 30.

This return force exerted by the projection 54 may be increased, as a measure of safety, in the embodiment shown in FIG. 5 by a force exerted on the support member 48 by the springs 49 resting on this support member and on the separation wall 14.

The use of these springs is by contrast little recommended for the embodiment shown in FIG. 4. In effect, such springs may, in the case of this figure, provoke displacement of the closure of the auxiliary distributors 38 before the end of the switching of the device and thus creating a blockage of the injector.

FIG. 6 shows a fourth embodiment of the auxiliary distribution system. In this embodiment, each distribution system primarily comprises a bore 55 provided in the separation wall 14 and, an obturator 59 of a form adapted to permit its sliding in this bore 55. Each bore 55 thus opens at one end into a chamber 30 and at the other end into an enclosure 12 while the obturator 59 of a greater length ends with respect to the wall 14 into one and the other chamber and enclosure.

In the wall 14 are additionally provided three conduits 56, 57, 58 arranged orthogonally to the bore 55 in such a manner as to empty into this bore at the level of a peripheral groove provided around its edge. The first conduit 56 comprising a fluid inlet, is connected to an auxiliary fluid feed conduit; the second conduit 57 comprising a fluid passage opening is connected to a chamber 30; the third conduit 58 comprising a fluid outlet empties to the outside air.

The obturator 59 comprises a hollow cylindrical body closed at its two ends and provided on its cylindrical wall with three apertures disposed in such a manner as to permit a sliding, either between the fluid inlet 56 and the fluid passage opening 57, or between the fluid passage opening 57 and the fluid outlet 58, the switching positions being obtained at the time of the sliding of the closure in the bore 55.

In order to preserve the seal of the wall 14, the valve 59 is also provided on its periphery with O-rings arranged around the assembly of holes provided on the peripheral wall.

The structure of the actuating means shown in FIGS. 4, 5 and 6 having been described, their operation will be explained hereafter with reference to FIGS. 9a, 9b, 9c; 10a, 10b, 10c; and 11a, 11b, 11c.

Figure 9:
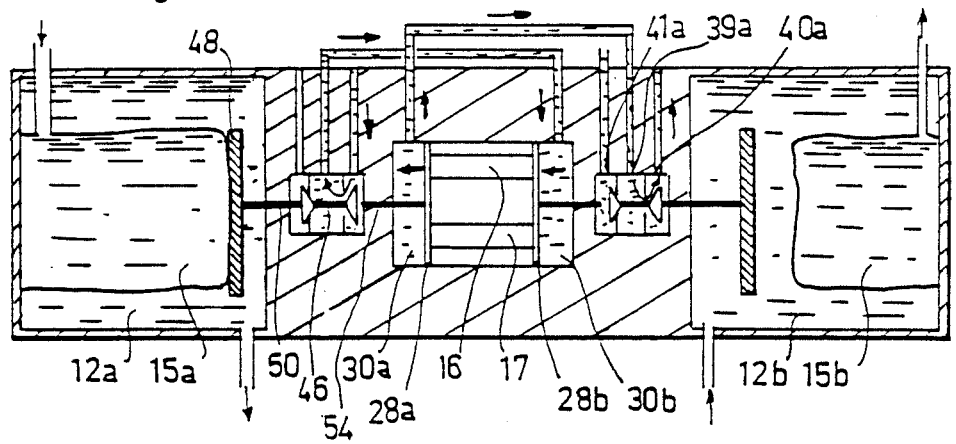
FIGS. 9a, 9b, 9c illustrate the operation of the actuating means conforming to the second embodiment of the invention.
Figure 9:
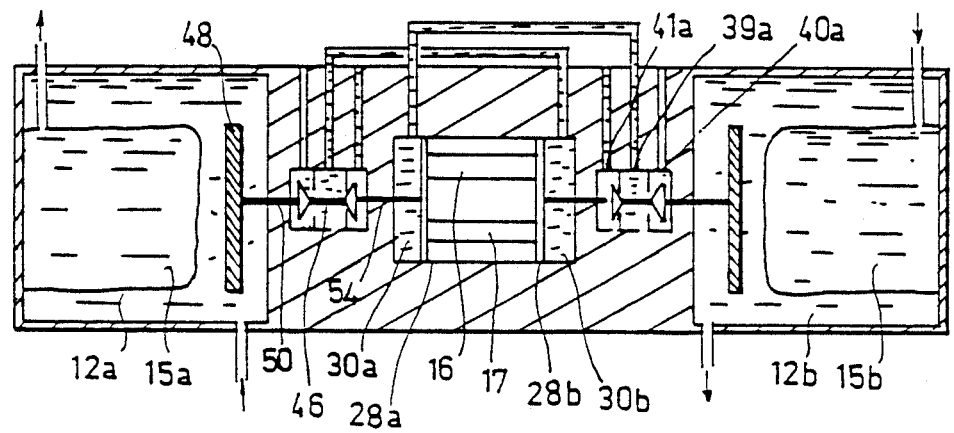
Figure 9:
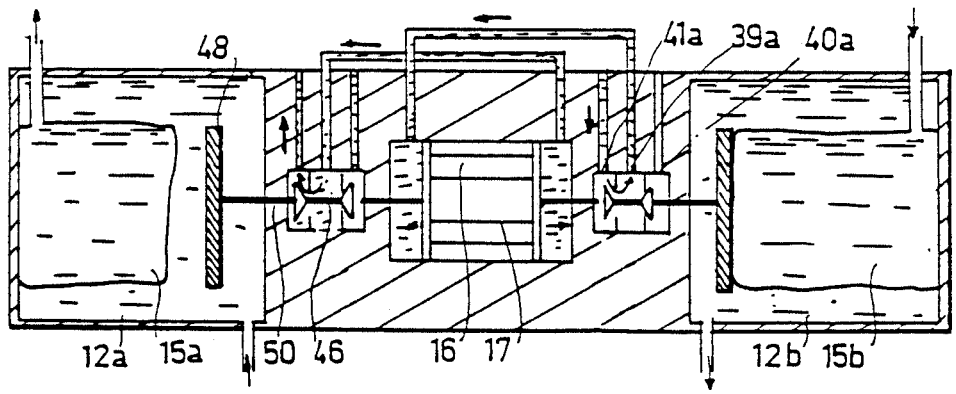

Initially, the auxiliary distributors 38 of the device shown in FIG. 9a are found in the reversed positions and this due to the initial displacement means. Thus, for one of these distributors, the fluid inlet 41a is in communication with the opening 39a, while for the second, this opening 39a is placed in communication with the fluid outlet 40a. Consequently, one of the sealed chambers (for example 30b) is called upon to be emptied while the other chamber 30a is called upon to be filled and the valves of the distributors 16, 17 are therefore displaced between their operative positions. In one of these operative positions, the distributors 16, 17 authorize the filling of a pouch and an enclosure, (for example 15a and 12b) and the emptying of the other pouch and the other enclosure (15b and 12a).

The pouch 15a being filled occupies progressively all of the volume of the enclosure 12a and at this stage, exerts pressure on the pressure member 48 upon which it exerts an increasing force. When this forces becomes greater than the force necessary to displace the small ball 52 from one groove 51 to the other, the closure 46 is displaced in such a manner that the inlet 41 of the auxiliary distributor 38 is connected to the opening 39a, while the other auxiliary distributor 38 not having been actuated, the opening 39a remains in communication with the outlet 40a.

The chamber 30b fills with fluid while the chamber 30a empties. The movable plates 28a, 28b are therefore displaced and carry with them the valves of the distributors 16, 17 so as to direct a change of state leading to the emptying of the pouch and the enclosure 12b, 15a previously being filled and simultaneously the filling of the pouch and the enclosure 12a, 15b previously being emptied.

At the same time, upon its displacement, the movable plate 28a of the chamber 30b carries with it the projection 54 which comes into contact with an extremity of the valve 46 upon which it exerts a force tending to repress this valve.

Under the effect of this force, the valve 46 is displaced toward its closed position where it prevents a flow of fluid between the inlet 41a and the opening 39a.

Thus, when in the intermediate phase (FIG. 9b), where each pouch is either partially filled or partially emptied, neither of the pouches 15 exerts any force on the support member 48, the valves 46 of the two auxiliary distributors 38 are found in similar positions corresponding to a non-feed of the chambers.

No displacement of the valve of the distributors 16, 17 is therefore possible and until the pouch 15b comes into contact with the support member 48 (FIG. 9c) thereby generating a new changing of the state of the distributor 16, 17.

The embodiment of these actuating means, of which the operation is illustrated in FIGS. 10a, 10b, 10c has the same manner of operation as the device described below.

The pouch 15a being filled exerts a sufficient force on the support member 48, the closure 36 of the auxiliary distributor 31 is displaced in such a manner as to authorize a flow of fluid between the fluid inlet 33a and the fluid outlet 32a.

One of the secondary fluid inlets 37b of the supplemental distributor 37 is thus fed with fluid, which produces a sealed switching of the said distributor and permits achieving the filling of the chamber 30b and simultaneously the emptying of the chamber 30a, and consequently generates a displacement of the valves of the distributor 16, 17.

In the same manner as for the device previously described, at the time of the intermediate phase (FIG. 10b), the closures 36 of the two auxiliary distributors 31 are found in similar positions where they obstruct the orifice 34 provided in the communication wall 35. The supplemental distributor 37 not being fed to the level of its secondary inlet 37b, thus remains in a state where only the chamber 30b is fed with fluid and this until the pouch 15b comes into contact with the support member 48.

It should be noted that the displacement of the valve 36 from its open position toward its closed position is obtained by means of the projection 54 to which it is convenient to add the repelling force of springs 49 previously compressed by the pouch 15a during its filling.

Figure 11A:
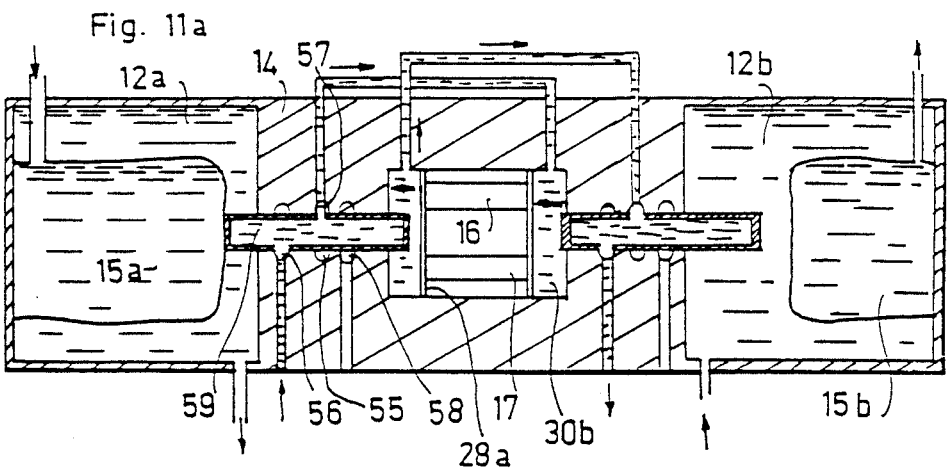
FIGS. 11a, 11b, 11c illustrate the operation of the actuation means according to the fourth embodiment.
Figure 11B:
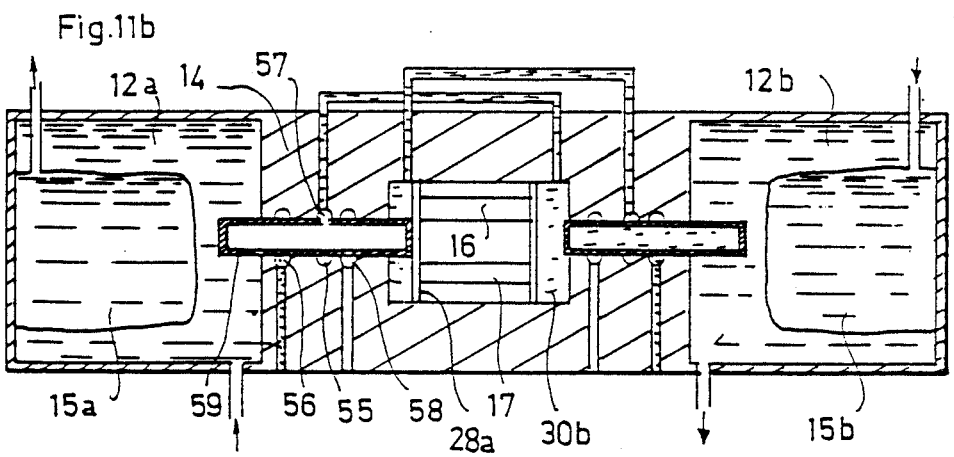
Figure 11C:
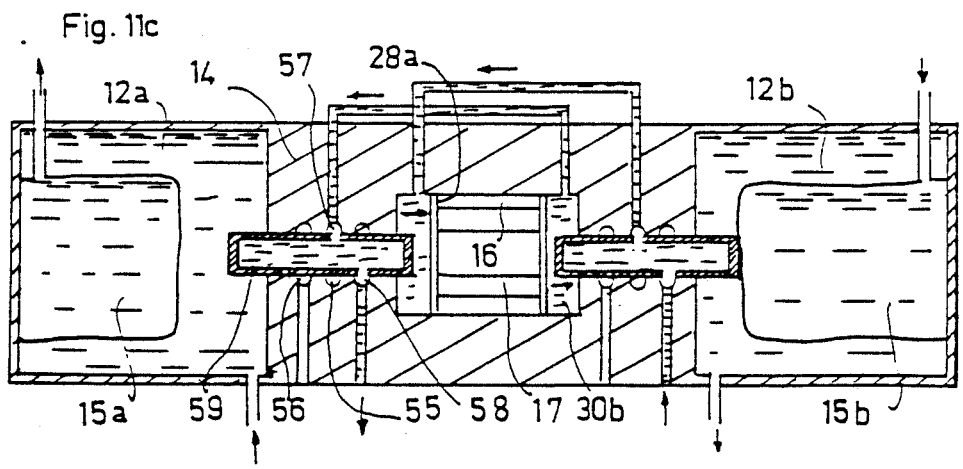

The injector the embodiment of which is illustrated in FIGS. 11a, 11b, 11c presents the advantage of permitting the switching of the distributors 16, 17 without necessitating the interposition of a pressure member and a supplemental distributor.

In effect, during the filling of the pouch 15a, this comes into contact with the extremity of the valve 49 found the enclosure 12a. It thus generates the displacement of the closure to a position where two of the orifices provided on the external wall of this closure are found opposite respectively the fluid inlet 56 and the fluid passage opening 57 of the bore 55. One of the chambers 30 is therefore fed, provoking the displacement of the plates 28 and thus the changing of the state of the distributors 16, 17. This displacement is equally authorized by the position of the second closure 59 which permits emptying of the chamber 30b.

At the end of the displacement, the plate 28a comes into contact against the extremity of the closure 59 positioned in the chamber 30a and repels this closure to a waiting position where two of the orifices provided on its external wall are found opposite the opening 57 and respectively the fluid outlet 58.

The two closures are thus found in the same waiting position (FIG. 11b) where they obstruct the fluid inlet 56 and until the pouch 15b comes into contact with the extremity of the valve situated in the enclosure 12b, thus creating a new switching (FIG. 11c).

The four embodiments of actuating means thus comprise means adapted to be positioned in a given fixed position, permitting an assurance against any change of state of the distributor 16, 17, and this while the actuating means are not influenced by the pouch being filled (or being emptied if that pouch is fixed on the wall 14). Further, when actuated, they generate a synchronized switching, full and complete, of the distributors 16, 17.

The different actuating means, mechanical (FIG. 3) or hydraulic (FIGS. 4, 5, 6) thus permit guaranteeing a constant injection ratio during more than 95% of the time of operation of the injector. The period of time during which the injection ratio is not strictly constant stems from:

for the mechanical actuating means the fact that the turns of the spring 25 lead to the creation of pressure drops which restrain the filling of the pouch coming into contact against the spring. By contrast, in counterpart, the presence of this spring permits, due to the restoration of accumulated energy upon its compression, a very rapid change of state of the distributors 16, 17;

for the hydraulic actuating means, from the fact that the relative slowness of displacement of the plates 28 causes a slow switching of the distributors 16, 17 and therefore a short interruption of the feed of the solution to the distribution network.

The importance of these phenomena may be minimized, either by taking them into consideration by the designing of the proportioning element 10a inserted into the feed conduit 10 of the auxiliary fluid, or by increasing the volume of the pockets 15 and thus the time of one cycle . . . etc. . . .

However, if a very great precision is desired, the solution may comprise combining the advantages of the two mechanical and hydraulic solutions. For that, it would be sufficient to insert between the two plates 28 a hydraulic actuating system, a mechanical actuating system (plates 22 connected by a connecting pin 23, springs 25 and magnets 27) against the springs of which the plates 28 come into contact at the time of their displacement.

The plates 28 against which is exerted a significant pressure corresponding to the pressure of the distribution network 8, therefore compressing easily the springs 25 until the force exerted is greater than the magnetic force exerted by the magnet 27. The restoration of energy stored by the spring 25 during its compression, thus creates a total and complete switching of the distributors 16 and 17.

Further, the filling of the pouch is never restrained, if one excepts the negligible force permitting the switching of the auxiliary distributor (31, 38) and moreover the changing of state of the distributors 16 and 17 is made essentially instantaneously. The injection ratio therefore remains constant during essentially the entire time of operation of the injector.

I claim:

1. An injector for injecting a fluid into a network (8) comprising in combination:
   a first switchable valved distributor (16) having at least one inlet for fluid to be injected, at least one outlet for fluid to be injected and two fluid passage openings, said distributor being adapted to present two states, one state in which the inlet and outlet for the fluid to be injected is found respectively in communication with one and the other opening and a state in which these communications are reversed,
   a second switchable valved distributor (17) having at least one auxiliary fluid inlet, at least one auxiliary fluid outlet and two fluid passage openings, said distributor being adapted to presenty two states, one state in which the inlet and outlet of the auxiliary fluid are found respectively in communication with one and the other opening and one state in which the communications are reversed,
   a hollow body divided by two sealing walls (14) into three enclosures (12a, 12b, 13), a first enclosure (12a) hermetically divided internally into two chambers (A1, B1) of variable volume and having a constant total volume, each of said chambers being provided with a fluid passage opening, a second enclosure (12b) hermetically divided internally into two chambers (A2, B2) of variable volume, having a constant total volume, each of said chambers being provided with a fluid passage opening, and a central enclosure (13) closing said distributors (16, 17), said first and second enclosures being laterally positioned on opposite sides of said central enclosure, first conduit means (18) connecting the opening of one of the chambers (A1, A2) of each enclosure and one opening of the first distributor (16) such that in one state of said distributor, one of said chambers (A1) is filled with fluid while the other chamber (A2) is emptied and that in the other state, the role of the chambers is reversed, second conduit means (20) connecting the opening of one chamber (B1, B2) of each enclosure and an opening of the second distributor (17) in such a manner that in one state of said distributor, one of said chambers (B2) is filled with fluid while the other chamber (B1) is emptied and that in the other state the role of these chambers is reversed, actuating means (22-27; 28-37; 48, 49, 50; 28, 29, 38-48, 50; 55-59) for the two distributors (16, 17) adapted to generate in synchronism their switching between their two states, for arranging them into configurations wherein said states are reversed:

one configuration in which one chamber (A1) of one enclosure is filled and the other chamber (B1) of said enclosure is emptied while in the other enclosure the chamber (B2) is filled with fluid and the chamber (A2) is emptied, another configuration in which the role of the chambers (A1, A2) is reversed according to the role of the chambers (B1, B2), and one of said chambers (A1, A2) of each enclosure being formed of a sealed and deformable pouch (15) adapted to occupy a variable volume in the interior of said enclosure (12), and the other chamber (B1, B2) of each enclosure comprising the volume of said enclosure exterior of said pouch (15).

2. An injector according to claim 1, characterized in that the actuating means (22-27) comprises:

means for moving (22, 23, 24, 25, 26) the valve of each distributor (16, 17) adapted to create in synchronism the switching of the distributors between their two states under the action of a force exerted by the extremity of one pouch 15, means (27) for retaining the moving means (22, 23, 24, 25, 26) adapted to exert on said moving means a retaining force tending to:

maintain each valve in a position corresponding to the first configuration of the distributors (16, 17) while the force exerted by the pouch on this moving means is less than the retention force, permit the displacement of the valves of each distributor in such a manner as to dispose these distributors (16, 17) in their second configuration when the force exerted by the pouch is greater than the retention force.

3. An injector as in claim 2 characterized in that the moving means (22, 23, 24, 25, 26) comprises:

displacement means (22, 23, 24) secured to each valve of the distributors (16, 17), a support member (26) arranged in each enclosure (12) in such a manner as to serve as an abutment of one extremity of the pouch (15) internal to said enclosure, elastic repelling means (25) associated with each support member (26) and with displacement means (22, 23, 24) and adapted to store the energy when the force exerted by the pouch on the support member (26) is less than the retention force exerted by the holding means (27) and release this energy at the time of displacement of the valves of the distributors (16, 17).

4. An injector as in claim 3, characterized in that the displacement means (22, 23, 24) of each valve of the distributors (16, 17) comprises:

two plates (22a, 22b) arranged on one side and the other of each distributor (16, 17) and each provided with at least one rod (24) having one end secured to a valve, a connection pin (23) connecting the two plates (22) in such a manner as to permit the synchronous displacement of said plates.

5. An injector as in claim 4, characterized in that each plate (22) comprises at least partially a magnetic material, said holding means being comprised of two magnets (27) disposed on opposite sides of the magnetic part of each plate.

6. Apparatus as in claim 2, characterized in that the actuating means comprises:

valve displacement means for each distributor (16, 17) comprising two movable plates (28) solidly connected to the valves of said distributors and each associated with a chamber (30) in a sealed manner in which they comprise a movable, sealing wall, two fluid distribution systems (31-37; 38-47; 55-59) each having at least one auxiliary fluid inlet (37a; 41a; 56), at least one auxiliary fluid outlet (37d; 40a; 58) and one fluid passageway (37c; 39a; 57) connected to a chamber (30), each of said distribution systems being adapted to have two states, one state in which their fluid inlets is in communication with the fluid passageway and one state in which said passageway is in communication with their fluid outlets, control means (48, 50, 54) for said distribution systems adapted to arrange them in two configurations in which their states are reversed:

one configuration in which one chamber (30a) is filled while the other chamber (30b) is emptied, a reversed configuration in which the role of the chambers (30) is reversed.

7. An injector as in claim 6, characterized in that the distribution systems are constituted by:

two auxiliary distributors including an auxiliary fluid inlet (33a) and an auxiliary fluid outlet (32a), said distributors each comprising an obturator fixed to the control means (48, 50, 54) and adapted to take two positions, an open position wherein it places in communication the fluit inlet and the fluid outlet and a closed position wherein it blocks such communication, a bi-stable supplemental distributor (37) having at least one primary auxiliary fluid inlet (37a), at least one auxiliary fluid outlet (37d), two fluid passages (37c) each connected respectively to a chamber (30) and two secondary fluid inlets (37b) each connected to a fluid outlet (32a) of an auxiliary distributor (31), said supplemental distributor being adapted for:

presenting two states, one state in which the primary fluid inlet (37a) and the auxiliary fluid outlet are respectively in communication with one and the other passage and one state in which these communications are reserved, causing a switching between said two states when one of said secondary inlets (37b) is fed with fluid.

8. An injector as in claim 6, characterized in that the distributions systems comprise two auxiliary distributors each comprising a fluid passage (39a) connected to a chamber (30), an auxiliary fluid outlet (40a), an auxiliary fluid inlet (41a), said distributors comprising a valve head (46) fixed to the control means (48, 50, 54) and adapted to take two positions, a closed position in which it places in communication the fluid passage (39a) and the fluid outlet (40a), and an open position in which it places in communication the fluid inlet (41a) and the fluid passage (39a).

9. An injector as in claim 7, characterized in that the control means of each distribution system comprises:
 a support member (48) arranged in each enclosure (12) in such a manner as to serve as a stop at one end for the internal pouch (15) of said enclosure,
 a connection pin (50) fixed to the support member (48) and having an end fixed to one end of the valve head (36; 46) of an auxiliary distributor (31; 38) in such a manner as to permit a displacement of said valve head from its closed position toward its open position,
 a projecting pin fixed to one movable plate (28) so as to come into contact with the extremity of the valve head (36; 46) of an auxiliary distributor opposite the fixed end of the connection pin (50) for permitting a displacement of this valve head from its open position toward its closed position.

10. An injector as in claim 9, characterized in that each connection pin (50) comprises positioning means constituting at leans one peripheral groove (51) formed on said connection pin and a small ball (52) associated with a spring and of dimensions adapted to permit its seating in said groove, said positioning means being adapted to position said connection pin (50) in one position where it permits maintaining the valve head (36; 46) in its open position.

11. An injector as in claim 9, characterized in that each connection pin comprises positioning means including a magnet facing each support member and positioned in such a manner that upon contact of said magnet and support member, the connection pin is located in a position where it permits holding the valve head of one of the auxiliary distributors in its open position.

12. An injector as in claim 9, characterized in that it comprises elastic means (49) associated with each support member (48) so as to exert on said member a repelling force tending to force a valve head (36) from its open position toward its closed position.

13. An injector as in claim 6, characterized in that each distribution system comprises:
 a bore (55) provided in the sealing wall (14) so as to empty respectively in one enclosure (12) and one chamber (30), said bore comprising an auxiliary fluid inlet (56), a fluid passage (57) connected to a chamber (30) and an auxiliary fluid outlet (58),
 a hollow valve element (59) of a configuration adapted to permit it to be housed in said bore, said valve element being movable between two positions:
  one position in which it places in communication the fluid inlet (56) and the passage (57),
  one position in which it places in communication the fluid passage (57) and the fluid outlet (58).

14. An injector as in claim 6, characterized in that it comprises actuating means in accordance with claim 2, associated with actuating means in accordance with claim 6 and fixed on said movable plates (28) in such a manner as to generate in synchronism a switching of said distributors (16, 17) between their two states, when the force exerted by said plates (28) is greater than the force exerted by the holding means (27) of said operating means (22-26).

15. An injection apparatus comprising an injector as in claim 1, characterized in that it comprises means for storing and feeding of a fluid to be injected and including a non-closed reservoir (1), arranged in such a manner as to be located under pressure with respect to the network (8).

16. An injection apparatus comprising an injector in accordance with claim 1, characterized in that it comprises means for storing and feeding of a solution to be injected and including at least one closed reservoir (3) containing a soluble product and provided with a fluid inlet connected to a feed passage (4) for auxiliary fluid and a fluid outlet connected to one of the distributors (16) by means of a conduit (2).

17. An injection apparatus as in claim 16, characterized in that it comprises:
 a proportioning module (5a) inserted in said conduit means (2) for said solution (2) and adapted to introduce, for a given flow of solution, a predetermined pressure drop,
 a diversion conduit (5b) connected at one end to the fluid feed conduit (4) and at the other end to the solution conduit means (2) downstream of said proportioning module (5a), said diversion conduit (5b) being adapted to introduce a pressure drop proportional to the pressure drop introduced by the proportioning module (5a), in a predetermined ratio to this pressure drop.

18. An injection apparatus as in claim 17, characterized in that it comprises two closed reservoirs (3) arranged in series and by-pass means (6a, 6b) adapted to permit the isolation of one or the other reservoir.

19. An injection apparatus comprising an injector conforming to claim 1, including an auxiliary fluid feed conduit (10) connected to one distributor (17) and to the network (8) and an emptying conduit (19) for fluid to be injected connected to the other distributor (16) and to the network (8) downstream of the connection of the feed conduit (10).

20. An injection apparatus as in claim 19, comprising a proportioning module (7) inserted in the network (8) downstream of the injection point of the auxiliary fluid feed conduit (10) and upstream of the injection point of the injection fluid emptying conduit (19), said proportioning module being adapted to introduce, for a given flow of fluid to be treated, a pressure drop of a predetermined value, the apparatus being characterised in that the auxiliary fluid feed conduit (10) is adapted to introduce a pressure drop proportional to the pressure drop introduced by the proportioning module (7) in a predetermined ratio with said pressure drop.

21. An injection apparatus as in claim 20, characterized in that proportioning module (7) includes a bundle of hollow tubes (9) of predetermined cross-section, said apparatus being characterized in that the auxiliary fluid feed conduit (10) comprises a proportioning element (10a) of a hydraulic behavoir essentially equivalent to the hydraulic behavoir of each tube of the bundle so as to introduce a pressure drop permitting a diversion a a given flow of fluid to be treated.

22. An injection apparatus as in claim 21, characterized in that the proportioning module (7) comprises a bundle of hollow tubes having internal restrictions of a cross-section adapted to compress the streams of liquid.

* * * * *